United States Patent
Brickhill

(10) Patent No.: US 9,349,040 B2
(45) Date of Patent: May 24, 2016

(54) BI-MODAL DEPTH-IMAGE ANALYSIS

(75) Inventor: David Brickhill, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 880 days.

(21) Appl. No.: 12/950,854

(22) Filed: Nov. 19, 2010

(65) Prior Publication Data

US 2012/0128201 A1    May 24, 2012

(51) Int. Cl.
*G06K 9/00* (2006.01)
*G06F 3/01* (2006.01)

(52) U.S. Cl.
CPC ............ *G06K 9/00362* (2013.01); *G06F 3/017* (2013.01); *G06K 9/00335* (2013.01); *G06K 9/00355* (2013.01); *G06K 9/00375* (2013.01)

(58) Field of Classification Search
None
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |

(Continued)

FOREIGN PATENT DOCUMENTS

| | | |
|---|---|---|
| CN | 101246602 A | 8/2008 |
| CN | 101657825 A | 2/2010 |

(Continued)

OTHER PUBLICATIONS

Schlattmann, et al., "Real-Time Bare-Hands-Tracking for 3d Games" Retrieved at << http://cg.cs.uni-bonn.de/aigaion2root/attachments/schlattmann-2009-games.pdf>>, In proceedings of IADIS International Conference Game and Entertainment Technologies (GET '09), 2009, pp. 9.

(Continued)

*Primary Examiner* — Aaron W Carter
(74) *Attorney, Agent, or Firm* — Gregg Wisdom; Judy Yee; Micky Minhas

(57) ABSTRACT

A depth-image analysis system calculates first mode skeletal data representing a human target in an observed scene if a portion of the human target is observed with a first set of joint positions, and calculates second mode skeletal data representing the human target in the observed scene if the portion of the human target is observed with a second set of joint positions different than the first set of joint positions. The first mode skeletal data and the second mode skeletal data have different skeletal joint constraints.

21 Claims, 7 Drawing Sheets

(56) References Cited

U.S. PATENT DOCUMENTS

| | | | |
|---|---|---|---|
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,563,988 A | 10/1996 | Maes et al. | |
| 5,577,981 A | 11/1996 | Jarvik | |
| 5,580,249 A | 12/1996 | Jacobsen et al. | |
| 5,594,469 A | 1/1997 | Freeman et al. | |
| 5,597,309 A | 1/1997 | Riess | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein, Jr. | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,875,108 A | 2/1999 | Hoffberg et al. | |
| 5,877,803 A | 3/1999 | Wee et al. | |
| 5,909,218 A * | 6/1999 | Naka et al. | 345/419 |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,054,991 A | 4/2000 | Crane et al. | |
| 6,066,075 A | 5/2000 | Poulton | |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,256,033 B1 | 7/2001 | Nguyen | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,363,160 B1 | 3/2002 | Bradski et al. | |
| 6,384,819 B1 | 5/2002 | Hunter | |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,674,877 B1 | 1/2004 | Jojic et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,386,150 B2 | 6/2008 | Fleisher | |
| 7,389,591 B2 | 6/2008 | Jaiswal et al. | |
| 7,412,077 B2 | 8/2008 | Li et al. | |
| 7,421,093 B2 | 9/2008 | Hildreth et al. | |
| 7,430,312 B2 | 9/2008 | Gu | |
| 7,436,496 B2 | 10/2008 | Kawahito | |
| 7,450,736 B2 | 11/2008 | Yang et al. | |
| 7,452,275 B2 | 11/2008 | Kuraishi | |
| 7,460,690 B2 | 12/2008 | Cohen et al. | |
| 7,489,812 B2 | 2/2009 | Fox et al. | |
| 7,536,032 B2 | 5/2009 | Bell | |
| 7,555,142 B2 | 6/2009 | Hildreth et al. | |
| 7,560,701 B2 | 7/2009 | Oggier et al. | |
| 7,570,805 B2 | 8/2009 | Gu | |
| 7,574,020 B2 | 8/2009 | Shamaie | |
| 7,576,727 B2 | 8/2009 | Bell | |
| 7,590,262 B2 | 9/2009 | Fujimura et al. | |
| 7,593,552 B2 | 9/2009 | Higaki et al. | |
| 7,598,942 B2 | 10/2009 | Underkoffler et al. | |
| 7,607,509 B2 | 10/2009 | Schmiz et al. | |
| 7,620,202 B2 | 11/2009 | Fujimura et al. | |
| 7,668,340 B2 | 2/2010 | Cohen et al. | |
| 7,680,298 B2 | 3/2010 | Roberts et al. | |
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |

(56) References Cited

U.S. PATENT DOCUMENTS

| | | | |
|---|---|---|---|
| 8,072,470 B2 | 12/2011 | Marks | |
| 8,740,702 B2* | 6/2014 | Langridge | A63F 13/04 463/36 |
| 8,994,718 B2* | 3/2015 | Latta | G06F 3/005 345/419 |
| 2004/0091153 A1 | 5/2004 | Nakano et al. | |
| 2006/0274947 A1 | 12/2006 | Fujimura et al. | |
| 2008/0026838 A1 | 1/2008 | Dunstan et al. | |
| 2008/0152191 A1* | 6/2008 | Fujimura et al. | 382/103 |
| 2008/0212836 A1* | 9/2008 | Fujimura et al. | 382/103 |
| 2009/0077504 A1* | 3/2009 | Bell et al. | 715/863 |
| 2009/0110292 A1* | 4/2009 | Fujimura | G06F 3/017 382/203 |
| 2009/0116692 A1* | 5/2009 | Paul et al. | 382/103 |
| 2010/0034457 A1* | 2/2010 | Berliner | G06K 9/00362 382/154 |
| 2011/0077065 A1* | 3/2011 | Sandoval et al. | 463/3 |
| 2011/0158546 A1* | 6/2011 | Huang | G06F 3/011 382/224 |
| 2012/0155705 A1* | 6/2012 | Latta | G06F 3/017 382/103 |
| 2012/0157198 A1* | 6/2012 | Latta | A63F 13/10 463/31 |
| 2013/0069867 A1* | 3/2013 | Watanabe | G06F 3/017 345/156 |
| 2013/0104089 A1* | 4/2013 | Rieffel | G06F 3/017 715/863 |
| 2013/0257720 A1* | 10/2013 | Noda | G06F 3/017 345/157 |
| 2013/0300662 A1* | 11/2013 | Liu | G06F 3/017 345/158 |
| 2015/0212585 A1* | 7/2015 | Latta | G06F 3/005 345/158 |
| 2015/0355717 A1* | 12/2015 | Bastien | G06K 9/00355 345/156 |

FOREIGN PATENT DOCUMENTS

| | | | | |
|---|---|---|---|---|
| CN | 201254344 B | 6/2010 | | |
| EP | 0520099 A1 * | 12/1992 | | G06F 15/72 |
| EP | 0583061 A2 | 2/1994 | | |
| JP | 08044490 A1 | 2/1996 | | |
| JP | 4422695 B2 | 2/2010 | | |
| WO | 93/10708 A1 | 6/1993 | | |
| WO | 97/17598 A1 | 5/1997 | | |
| WO | WO 9740471 A1 * | 10/1997 | | G06T 13/00 |
| WO | 99/44698 A1 | 9/1999 | | |
| WO | WO 2004045725 A1 * | 6/2004 | | A63B 69/00 |

OTHER PUBLICATIONS

Ren, et al., "Immersive and Perceptual Human-Computer Interaction Using Computer Vision Techniques", Retrieved at << http://ieeexplore.ieee.org/stamp/stamp.jsp?tp=&arnumber=5543161>>, Computer Vision and Pattern Recognition Workshops (CVPRW), 2010 IEEE Computer Society Conference on Jun. 13-18, 2010, pp. 66-72.

Srinivasan, et al., "Bottom-Up Recognition and Parsing of the Human Body" Retrieved at << http://www.cis.upenn.edu/~jshi/papers/A2553.pdf >>, Proceedings of the 6th international conference on Energy minimization methods in computer vision and pattern recognition, 2007, pp. 8.

Chai et al., "Vision-based real-time game interface" Retrieved at << http://ieeexplore.ieee.org/stamp/stamp.jsp?arnumber=05293605>>, Games Innovations Conference, 2009. ICE-GIC 2009. International IEEE Consumer Electronics Society's , Aug. 25-28, 2009, pp. 43-46.

Micilotta, et al., "View-based Location and Tracking of Body Parts for Visual Interaction" Retrieved at << http://info.ee.surrey.ac.uk/Personal/R.Bowden/publications/bmvc04/micilotta_bowden_BMVC2004.pdf>>, 2004, pp. 10.

Knoop, et al., "Sensor Fusion for 3D Human Body Tracking with an Articulated 3D Body Model", Retrieved at << http://i61www.itec. uni-karlsruhe.de/data/File/Publications/icra06_2.pdf , May 15, 2006, pp. 7.

Mathe, Zsolt, "Body Scan", MS#325986.01, U.S. Appl. No. 12/363,542, filed Jan. 30, 2009, 39 pages.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

(56) References Cited

OTHER PUBLICATIONS

Fisher et al., "Virtual Environment Display System", ACM Workshop on Interactive 3D Graphics, Oct. 1986, Chapel Hill, NC.
"Virtual High Anxiety", Tech Update, Aug. 1995, pp. 22.
Sheridan et al., "Virtual Reality Check", Technology Review, Oct. 1993, pp. 22-28, vol. 96, No. 7.
Stevens, "Flights into Virtual Reality Treating Real World Disorders", The Washington Post, Mar. 27, 1995, Science Psychology, 2 pages.
"Simulation and Training", 1994, Division Incorporated.
ISA State Intellectual Property Office of the People's Republic of China, First Office Action and Search Report Issued in Chinese Patent Application No. 201110386118.9, Jan. 22, 2014, 11 pages.
ISA State Intellectual Property Office of the People's Republic of China, Second Office Action and Search Report Issued in Chinese Patent Application No. 201110386118.9, Oct. 10, 2014, 14 pages.
The State Intellectual Property Office of China, Third Office Action Issued in Chinese Patent Application No. 201110386118.9, Apr. 3, 2015, China, 9 pages.

* cited by examiner

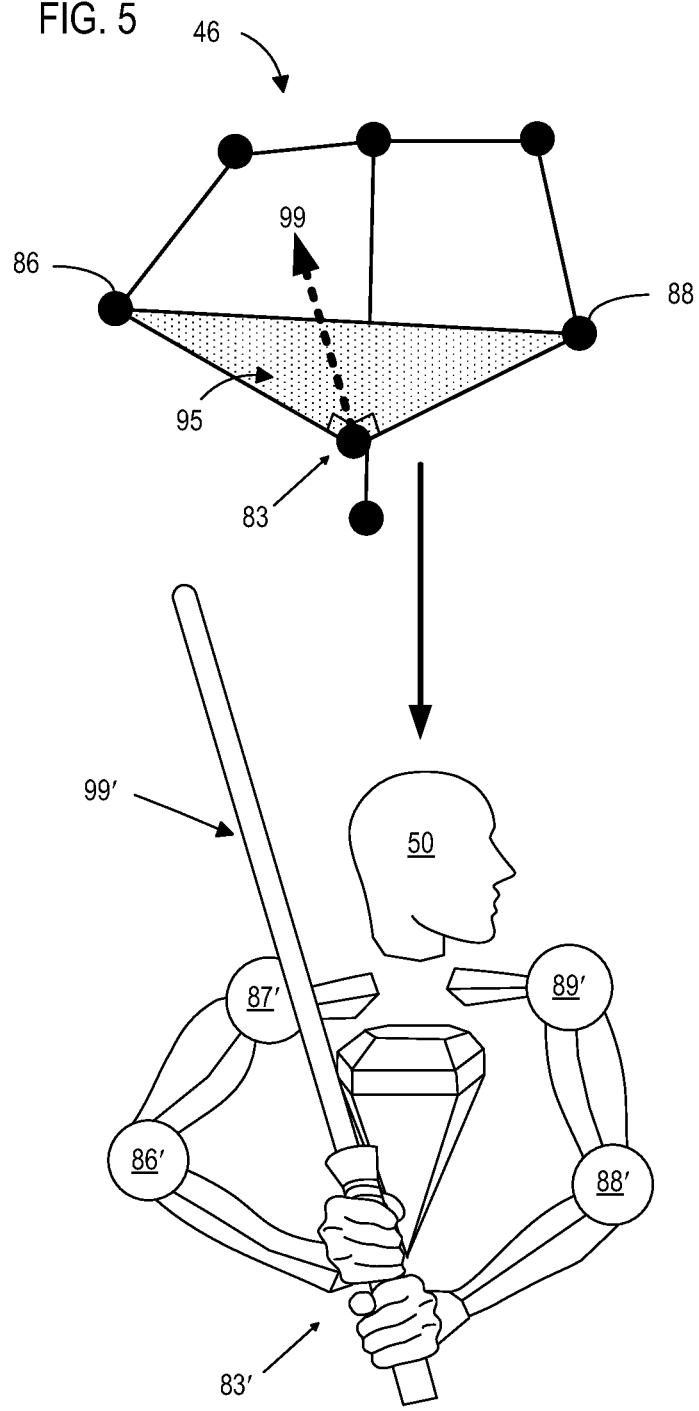

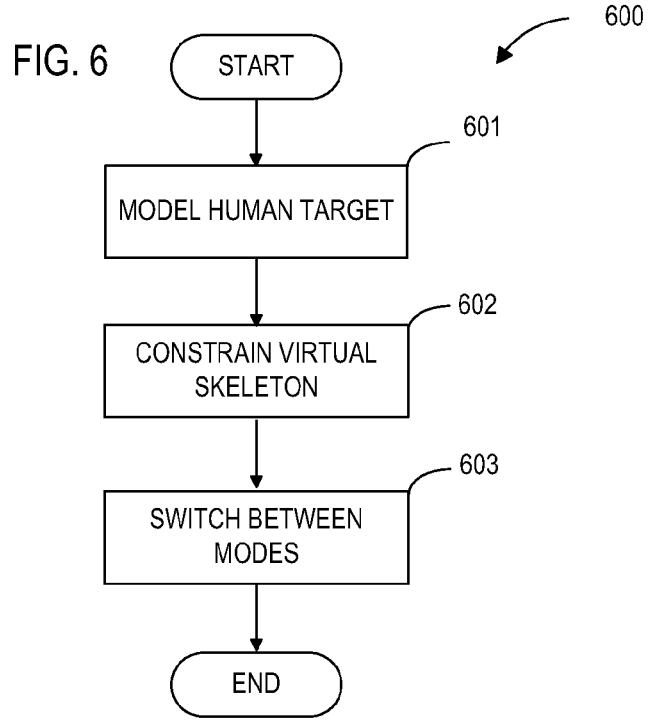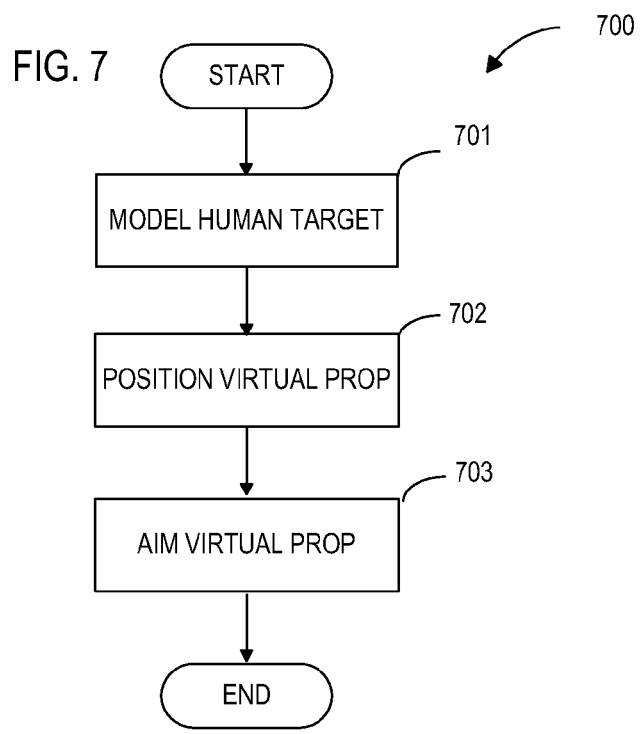

BI-MODAL DEPTH-IMAGE ANALYSIS

BACKGROUND

Computer technology has advanced to enable humans to interact with computers in various ways. One such interaction may occur between humans and gaming systems. Some gaming systems may respond to a player's physical movement. However, a player's movement may be misinterpreted creating an unsatisfying gaming experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Depth-image analysis is performed with a device that analyzes a human target within an observed scene by capturing depth-images that include depth information from the observed scene. The human target is modeled with a skeleton including a plurality of joints. First mode skeletal data representing the human target in the observed scene is output if a portion of the human target is observed with a first set of joint positions. Second mode skeletal data representing the human target in the observed scene is output if the portion of the human target is observed with a second set of joint positions different than the first set of joint positions. The first mode skeletal data and the second mode skeletal data have different skeletal joint constraints.

BRIEF DESCRIPTION OF THE DRAWINGS

FIG. 5 shows a virtual avatar with a virtual prop.

FIG. 6 is a flowchart illustrating a method for tracking a human target in accordance with an embodiment of the present disclosure.

FIG. 7 is a flowchart illustrating a method for positioning and aiming a virtual prop in accordance with an embodiment of the present disclosure.

DETAILED DESCRIPTION

A depth-image analysis system, such as a 3D-vision gaming system, may include a depth camera capable of observing one or more players. As the depth camera captures images of a player within an observed scene, those images may be interpreted and modeled with one or more virtual skeletons. Sometimes a player may be in a position that is difficult to interpret and accurately model with a virtual skeleton. For example, a player may be turned to the side such that some parts of the player are hidden from the depth camera, and therefore, may not appear in those depth-images captured by the depth camera. As another example, a player's hands may be clasped together, making it difficult for the system to distinguish the left hand from the right hand. As a result of these and other difficult scenarios, the virtual skeleton(s) used to model the player may jitter from frame to frame, or otherwise inaccurately model the player. However, the following disclosure at least partially alleviates the aforementioned problems by implementing bi-modal skeletal modeling and occluded joint finding.

As one nonlimiting example, bi-modal skeletal modeling can be used to recognize when a player is posed with left and right hands separated and operating independently and when a player is posed with left and right hands brought together and operating in unison (e.g., when holding a real or imaginary prop). The skeletal modeling may be tuned depending on the mode (e.g., one-hand mode or two-hand mode) in order to alleviate skeletal jitter and/or other modeling problems. Furthermore, occluded joint positions may be estimated, thus alleviating skeletal jitter and/or other problems. While one-hand mode and two-hand mode are provided as an example bi-modal modeling, it is to be understood that additional and/or alternative modes may be implemented (e.g., sitting/standing, standing/kneeling, etc.). Further, three or more modes may be implemented (e.g., sitting/kneeling/standing, etc.).

Figure 1:
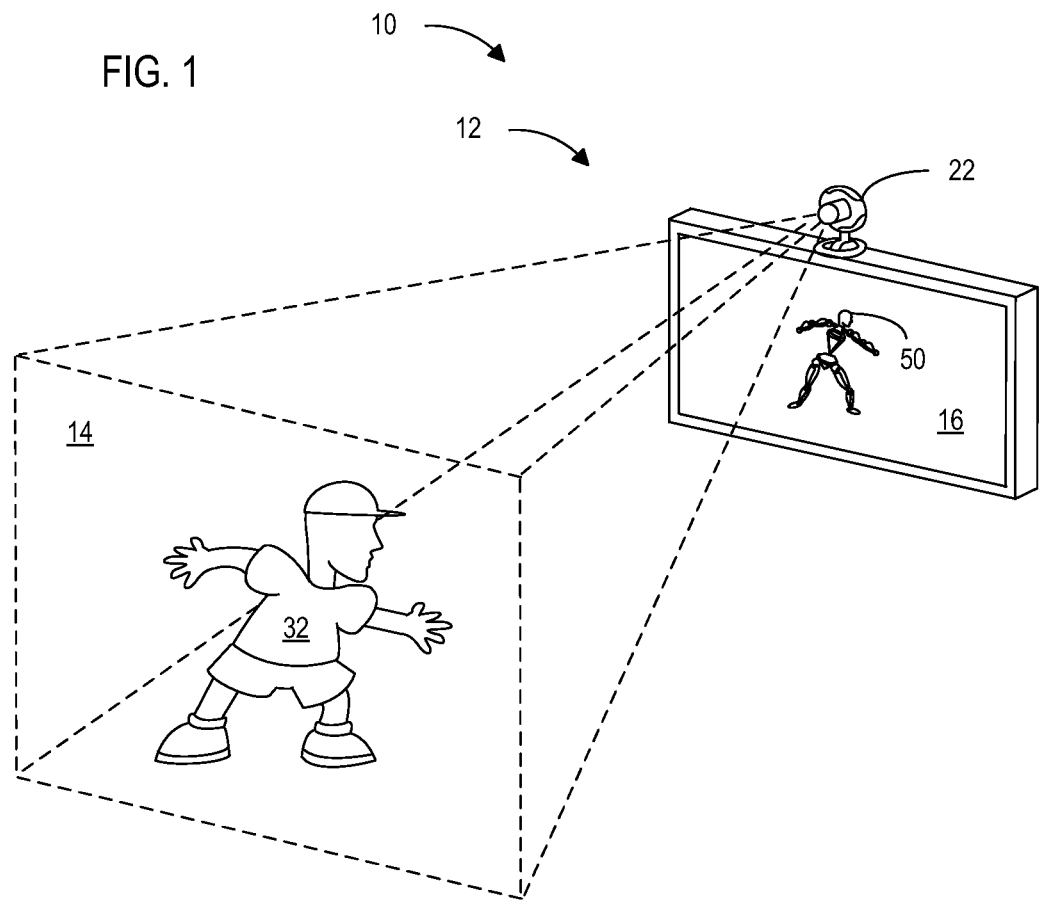
FIG. 1 shows a depth-image analysis system viewing an observed scene in accordance with an embodiment of the present disclosure.

FIG. 1 shows a nonlimiting example of a depth-image analysis system 10. In particular, FIG. 1 shows a gaming system 12 that may be used to play a variety of different games, play one or more different media types, and/or control or manipulate non-game applications. FIG. 1 also shows a display device 16 such as a television or a computer monitor, which may be used to present game visuals to game players. As one example, display device 16 may be used to visually present a virtual avatar 50 that human target 32 controls with his movements. The depth-image analysis system 10 may include a capture device, such as a depth camera 22 that visually monitors or tracks human target 32 within an observed scene 14. Depth camera 22 is discussed in greater detail with respect to FIGS. 2 and 8.

Human target 32 is shown here as a game player within observed scene 14. Human target 32 is tracked by depth camera 22 so that the movements of human target 32 may be interpreted by gaming system 12 as controls that can be used to affect the game being executed by gaming system 12. In other words, human target 32 may use his or her movements to control the game. The movements of human target 32 may be interpreted as virtually any type of game control. Some movements of human target 32 may be interpreted as controls that serve purposes other than controlling virtual avatar 50. For example, human target 32 may use movements to end, pause, save, select a level, view high scores, communicate with another player, etc.

Depth camera 22 may also be used to interpret human target movements as operating system and/or application controls that are outside the realm of gaming. Virtually any controllable aspect of an operating system and/or application may be controlled by movements of a game player, such as human target 32. The illustrated scenario in FIG. 1 is provided as an example, but is not meant to be limiting in any way. To the contrary, the illustrated scenario is intended to demonstrate a general concept, which may be applied to a variety of different applications without departing from the scope of this disclosure.

The methods and processes described herein may be tied to a variety of different types of computing systems. FIG. 1 shows a nonlimiting example in the form of gaming system 12, display device 16, and depth camera 22. In general, a depth-image analysis system may include a computing system 60, shown in simplified form in FIG. 8, which will be discussed in greater detail below.

Figure 2:
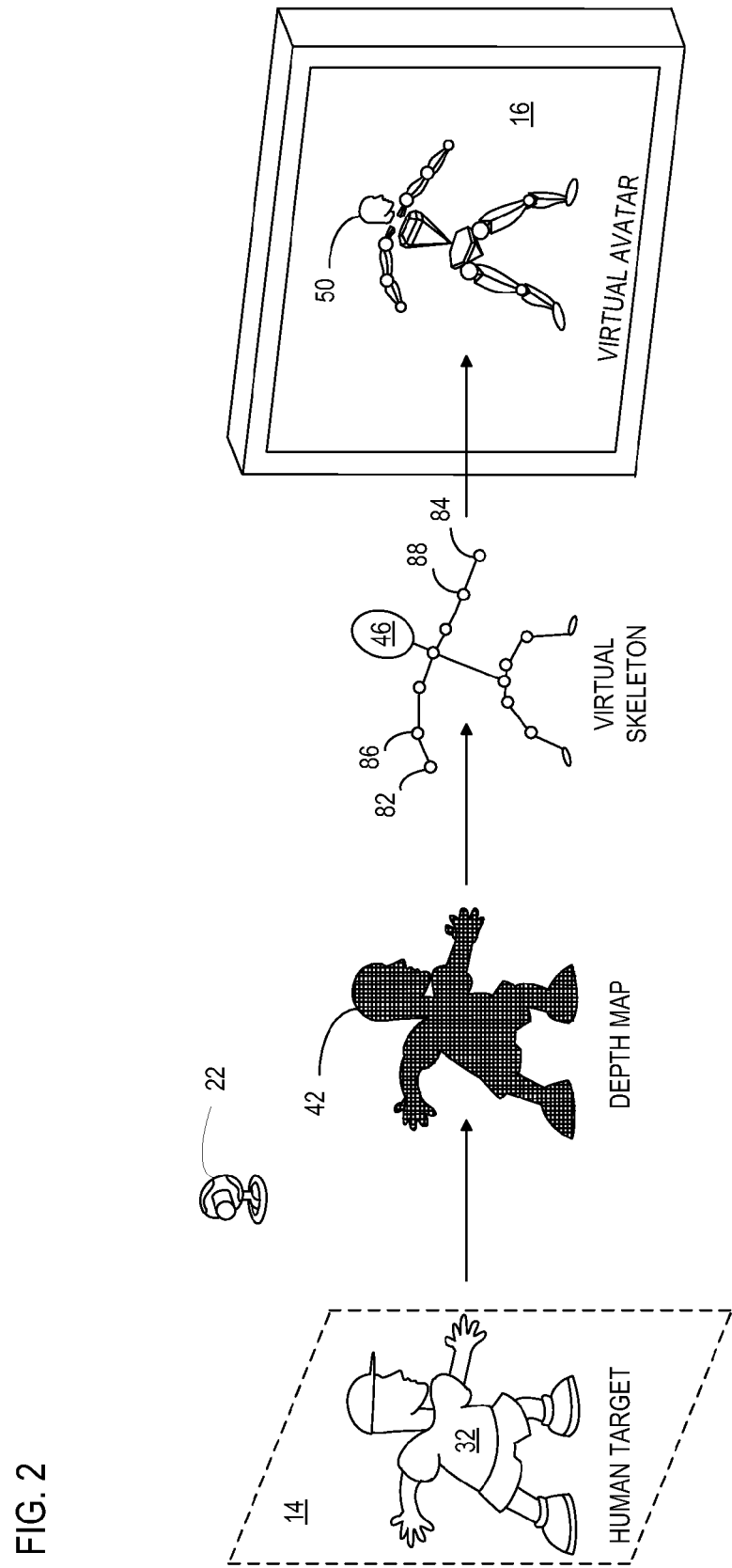
FIG. 2 somewhat schematically shows a human target in an observed scene being modeled with example skeletal data.

FIG. 2 shows a simplified processing pipeline in which human target 32 in an observed scene 14 is modeled as a virtual skeleton 46 that can be used to draw a virtual avatar 50 on display device 16. It will be appreciated that a processing pipeline may include additional steps and/or alternative steps than those depicted in FIG. 2 without departing from the scope of this disclosure.

As shown in FIG. 2, human target 32 and the rest of observed scene 14 may be imaged by a capture device such as depth camera 22. The depth camera may determine, for each pixel, the depth of a surface in the observed scene relative to the depth camera. In some embodiments, depth camera 22 may further determine the intensity of one or more channels of light (e.g., red, green, blue) reflected from the surface at that pixel. Virtually any depth finding technology may be used without departing from the scope of this disclosure. Example depth finding technologies are discussed in more detail with reference to capture device 68 of FIG. 8.

The depth information determined for each pixel may be used to generate a depth map 42. Such a depth map may take the form of virtually any suitable data structure, including but not limited to a matrix that includes a depth value for each pixel of the observed scene. In FIG. 2, depth map 42 is schematically illustrated as a pixelated grid of the silhouette of human target 32. This illustration is for simplicity of understanding, not technical accuracy. It is to be understood that a depth map generally includes depth information for all pixels, not just pixels that image the human target 32, and that the perspective of depth camera 22 would not result in the silhouette depicted in FIG. 2.

Virtual skeleton 46 may be derived from depth map 42 to provide a machine readable representation of human target 32. In other words, virtual skeleton 46 is derived from depth map 42 to model human target 32. The virtual skeleton 46 may be derived from the depth map in any suitable manner. In some embodiments, one or more skeletal fitting algorithms may be applied to the depth map. The present disclosure is compatible with virtual any skeletal modeling techniques.

The virtual skeleton 46 may include a plurality of joints, each joint corresponding to a portion of the human target. In FIG. 2, virtual skeleton 46 is illustrated as a fifteen-joint stick figure. In particular, virtual skeleton 46 includes a left elbow joint 88, a right elbow joint 86, a left hand joint 84, and a right hand joint 82, among others. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, etc.). It is to be understood that a virtual skeleton may take the form of a skeletal data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 2, a virtual avatar 50 may be rendered on display device 16 as a visual representation of virtual skeleton 46. Because virtual skeleton 46 models human target 32, and the rendering of the virtual avatar 50 is based on the virtual skeleton 46, the virtual avatar 50 serves as a viewable digital representation of the human target 32. As such, movement of virtual avatar 50 on display device 16 reflects the movements of human target 32.

In the illustrated example, virtual skeleton 46 represents the raw skeleton derived from depth map 42. In some scenarios, it may be beneficial to modify the virtual skeleton before rendering the virtual avatar from the virtual skeleton. As an example, one or more joint positions may be constrained—e.g., two-hand mode joint constraints, as described below. Details concerning the modification of a virtual skeleton prior to rendering the virtual avatar are discussed below with reference to FIGS. 3 and 4.

Furthermore, while virtual avatar 50 is used as an example aspect of a game that may be controlled by the movements of a human target via the skeletal modeling of a depth map, this is not intended to be limiting. A human target may be modeled with a virtual skeleton, and the virtual skeleton can be used to control aspects of a game or other application other than a virtual avatar. For example, the movement of a human target can control a game or other application even if a virtual avatar is not rendered to the display device.

Figure 3:
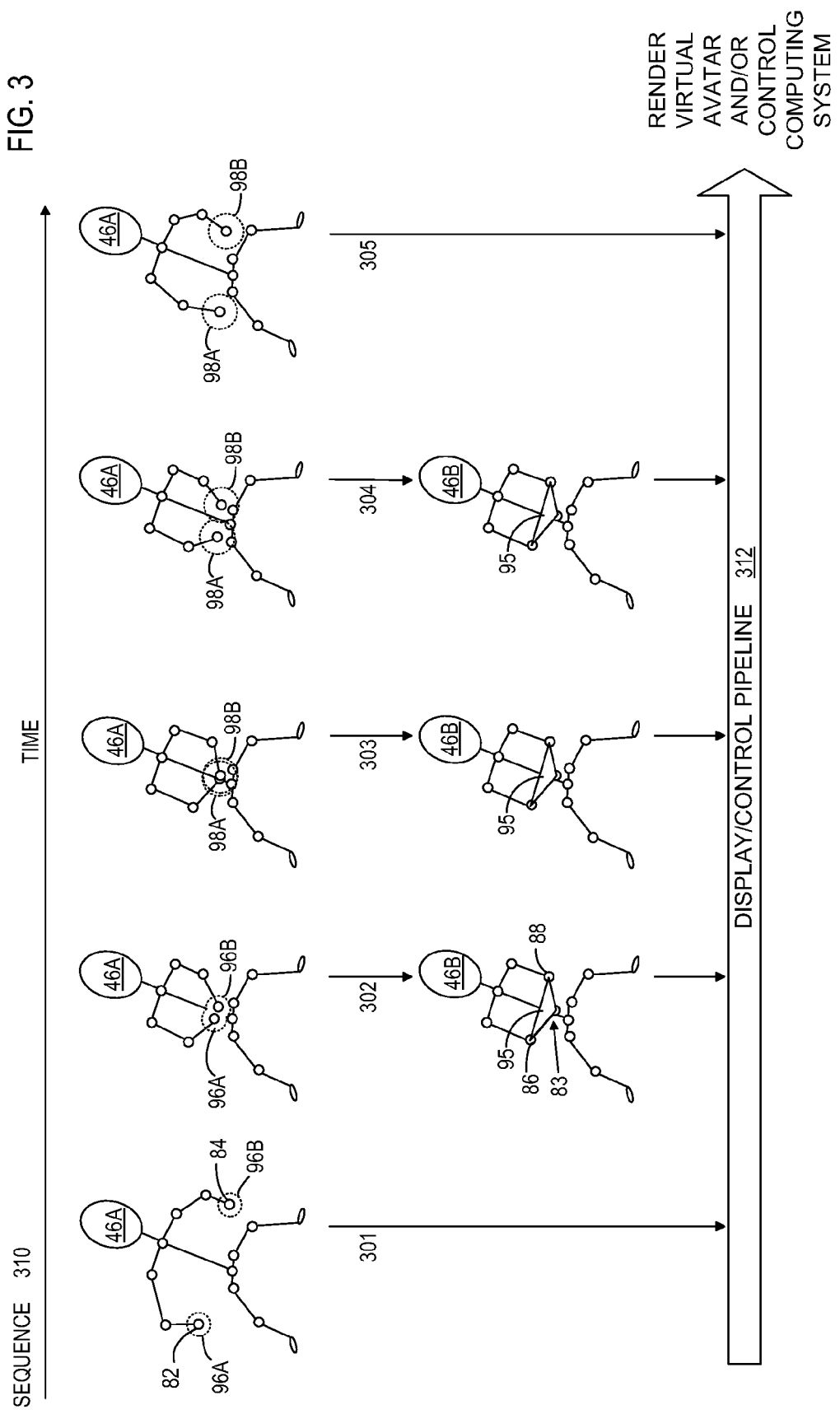
FIG. 3 shows a sequence of skeletal data modeling a human target in one-hand mode and two-hand mode.

FIG. 3 shows original virtual skeleton 46A modeling a sequence 310 of human target movements over time. Constrained virtual skeleton 46B may be derived from original virtual skeleton 46A if parameters of original virtual skeleton 46A satisfy one or more criteria. In this particular example, constrained virtual skeleton 46B is constrained according to two-hand mode from one-hand mode if the left and right hands are deemed to be within a threshold distance of one another. In other embodiments, different constraints and/or criteria may be applied.

At frame 301, virtual skeleton 46A includes a left hand joint 84 and a right hand joint 82. Each hand joint is associated with a spatial locking threshold (e.g., right hand spatial locking threshold 96A and left hand spatial locking threshold 96B). In the illustrated embodiment, each spatial locking threshold moves with the hand joint and is a generally spherical area centered about the hand joint.

When the spatial locking thresholds of each hand are separated, virtual skeleton 46A is recognized to be in a first mode—i.e., one-hand mode. As such, at frame 301 original virtual skeleton 46A is not constrained according to two-hand mode constraints, and original virtual skeleton 46A is used by a display/control pipeline 312 to render a virtual avatar or otherwise control aspects of a computing system.

At frame 302, the left and right hands have moved together and virtual skeleton 46A has intersecting spatial locking thresholds. When the spatial locking thresholds intersect, virtual skeleton 46A is recognized to be in a second mode—i.e., two-hand mode. As such, at frame 302 original virtual skeleton 46A is constrained according to two-hand mode constraints, and constrained virtual skeleton 46B is used by the display/control pipeline 312 to render a virtual avatar or otherwise control aspects of a computing system.

The example spatial locking threshold implementation described above is nonlimiting. Other spatial locking threshold implementations may be applied without departing from the scope of this disclosure. In some embodiments, one hand joint may have a spatial locking threshold, and two-hand mode may be achieved if the other hand enters into this spatial locking threshold. In some embodiments, two-hand mode may not be entered into unless the spatial locking threshold criterion is maintained for a temporal threshold criterion. In other words, two-hand mode will only be achieved if the hands are sufficiently close for a sufficiently long period of time. Virtually any suitable criteria for determining if a human target is intending to use a real or imaginary two-handed prop may be used without departing from the scope of this disclosure.

As shown with reference to constrained virtual skeleton 46B in frame 302, second mode skeletal data (e.g., two-hand mode) may be associated with second skeletal joint constraints, different from the first skeletal joint constraints of the first mode skeletal data. For example, two-hand mode may implement a stable joint complex 95 that includes locked hand unit 83, left elbow joint 88, and right elbow joint 86. Locked hand unit 83 may include a right hand joint and a left hand joint which are constrained to be locked together, even if original virtual skeleton 46A shows the hand joints separated. Locked hand unit 83 may be constrained to an average observed position of the left hand joint and the right hand joint, for example. As another example, locked hand unit 83 may be constrained to either the observed position of the left hand joint or the observed position of the right hand joint. In such cases, the hand joint position that is observed with the highest positional confidence may be selected as the position to which the locked hand unit is constrained.

One or more joints included in stable joint complex 95 may have a reduced degree of freedom, whereas joints not included within stable joint complex 95 may have normal degrees of freedom. It will be appreciated that locked hand unit 83 is free to move as a unit, and the term locked is merely used to describe the association of the left hand joint relative to the right hand joint.

As shown at frame 303, once two-hand mode is achieved, a left hand spatial unlocking threshold 98A and a right hand spatial unlocking threshold 98B may be implemented for determining when to switch back to one-hand mode from two-hand mode. In this implementation, one-hand mode is achieved if the unlocking thresholds become separated. The size of spatial unlocking thresholds compared to spatial locking thresholds may be selected based on the amount of observed movement that may trigger a switch from one-hand mode to two-hand mode, or vice versa. In some embodiments, including the embodiment illustrated in FIG. 3, the spatial locking threshold may be smaller than the spatial unlocking threshold. In such cases, it takes relatively greater hand separation to trigger a switch from two-hand mode to one-hand mode, thus potentially avoiding false switches.

Similar to the spatial locking thresholds discussed above, the spatial unlocking thresholds may be implemented in any desired manner, and may be incorporated with other criteria, such as temporal criterion. For example, a switch from two-hand mode to one-hand mode may only be achieved if the hand joints are observed separated by a threshold distance for a threshold duration of time.

At frame 303, virtual skeleton 46A is shown with intersecting left hand spatial unlocking threshold 98A and right hand spatial unlocking threshold 98B. As such, at frame 303 original virtual skeleton 46A is constrained according to two-hand mode constraints, and constrained virtual skeleton 46B with stable joint complex 95 is used by the display/control pipeline 312 to render a virtual avatar or otherwise control aspects of a computing system. The same is true for frame 304, although the left hand joint and the right hand joint have moved even farther apart.

At frame 305, virtual skeleton 46A is shown with separated left hand spatial unlocking threshold 98A and right hand spatial unlocking threshold 98B. As such, at frame 305 original virtual skeleton 46A is not constrained according to two-hand mode constraints, and original virtual skeleton 46A is used by the display/control pipeline 312 to render a virtual avatar or otherwise control aspects of a computing system.

FIG. 3 is provided as an example of the skeletal data modification that may occur between original virtual skeleton 46A and constrained virtual skeleton 46B and is not meant to be limiting in any way. In some embodiments the hand joints may be constrained differently and/or other portions of the virtual skeleton may additionally and/or alternatively be constrained. In some embodiments, original virtual skeleton 46A may be constrained more than once per frame.

Figure 4:
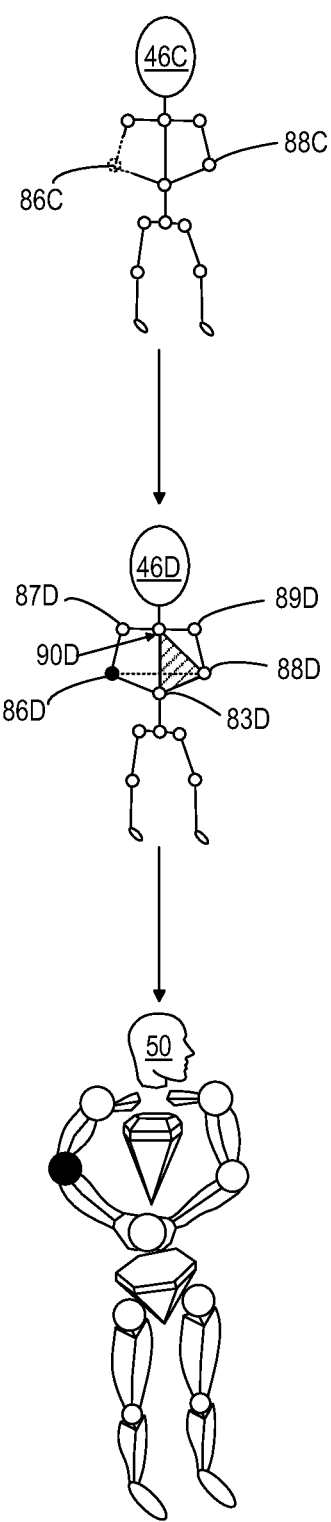
FIG. 4 schematically shows occluded joint analysis.

FIG. 4 schematically shows occluded joint finding. Occluded joints may occur when a human target is in such a position that one or more body parts are not clearly defined within the depth map. In other words, a depth camera may capture a depth map that is missing some depth data representative of one or more body parts of a human target because those body parts are obscured from view. In such a scenario, the depth data that is acquired (representative of unoccluded/visible body parts) may be used to approximate the missing depth data (occluded body parts). Any number of methods may be employed to approximate missing depth data from acquired (visible) depth data, and FIG. 4 is provided as one nonlimiting example.

FIG. 4 shows partial skeleton 46C with a visible left elbow joint 88C and an occluded right elbow joint 86C. If partial skeleton 46C were to be derived only from the acquired depth map, the depth data representative of right elbow joint 86C would be missing. Thus, partial skeleton 46C may be used to approximate right elbow joint 86C and complete virtual skeleton 46D.

As shown, virtual skeleton 46D includes locked hand unit 83D, visible elbow 88D, left shoulder 89D and right shoulder 87D, among other joints. Visible elbow 88D, locked hand unit 83D and a point between left and right shoulders 89D and 87D, such as sternum 90D, may form a triangle used to derive approximated elbow 86D. Approximated elbow 86D may be positioned as a reflection of visible elbow 88D across a line between locked hand unit 83D and sternum 90D. Once approximated elbow 86D is obtained, virtual skeleton 46D may be used to render virtual avatar 50 and/or otherwise control a computing system.

It will be appreciated that FIG. 4 is provided as an example for approximating an occluded joint, such as occluded elbow 86C, and that other occluded joints may be approximated by utilizing additional and/or alternative visible joints. Approximating an occluded joint as a reflection of a visible joint is provided as one example and other methods for approximating an occluded joint using unoccluded/visible joints as points of reference may be used without departing from the scope of this disclosure.

In some scenarios, a player of an electronic game may hold or pretend to hold an object, such as a sword or a racquet. In such scenarios, the motions of the player and the real or imaginary object may be considered when adjusting and/or controlling parameters of the electronic game. For example, the motion of a player holding (or pretending to hold) a sword may be tracked and utilized for controlling an on-screen sword in an electronic sword fighting game.

FIG. 5 shows an example of virtual avatar 50 with a virtual prop 99' (i.e., a virtual light saber) and a portion of a virtual skeleton 46 used to render the virtual avatar 50. Virtual avatar 50 includes a plurality of joints that correspond to joints of the virtual skeleton 46—those depicted in FIG. 5 include locked hand unit 83', left elbow joint 88', right elbow joint 86', left shoulder 89', and right shoulder 87'. It will be appreciated that virtual avatar 50 may include additional and/or alternative joints. Virtual skeleton 46 may optionally be associated with a two-handed prop vector 99, which may be used to orientate virtual prop 99' relative to virtual avatar 50.

Two-handed prop vector 99 may have a fixed orientation relative to the stable joint complex 95. Two-handed prop vector 99 may originate from locked hand unit 83 and may be positioned such that two-handed prop vector 99 is perpendicular to the plane defined by locked hand unit 83, left elbow joint 88, and right elbow joint 86.

Virtual prop 99' may be rendered in accordance with the position and orientation of two-handed prop vector 99. Because the position and orientation of the two-handed prop vector is based on the stable joint complex 95 of virtual skeleton 46, the corresponding position and orientation of the virtual prop 99' benefits from the modeling stability provided by the stable joint complex. As such, the virtual prop 99' is protected from jitter and other modeling/rendering problems.

In some embodiments, one or more additional parameters may be used to modify an orientation of a two-handed prop vector. For example, game artificial intelligence and/or skeletal acceleration may be used to deviate from a two-handed prop vector that is perpendicular to the plane defined by locked hand unit 83, left elbow joint 88, and right elbow joint 86. In some embodiments, an orientation and/or extension of the hands may be used to modify an orientation of the two-handed prop vector.

FIG. 5 is provided as a nonlimiting example for positioning a virtual prop, such as a weapon, without the human target holding a physical prop. In this example, the human target is observed in two-hand mode, and it will be appreciated that a virtual prop may be included during other modes. For example, virtual avatar 50 may include a virtual prop when human target is observed in one-hand mode. In another example, a human target may hold a physical prop that may be captured by a depth camera and included as part of the skeletal data. In other words, a target may include a human and an object. In such embodiments, for example, a player of an electronic game may be holding an object, such that the motions of the player and the object are utilized to adjust and/or control parameters of the electronic game.

FIG. 6 is a flowchart illustrating a method 600 of tracking a human target. At 601, method 600 includes modeling the human target observed within a depth map obtained from one or more depth cameras with a virtual skeleton including a plurality of joints. The plurality of joints may include, among others, a left hand joint and a right hand joint. At 602, method 600 includes constraining the virtual skeleton to a two-hand mode if the left hand joint and the right hand joint are observed to move within a spatial locking threshold of one another. In the two-hand mode, the left hand joint and the right hand joint are locked together as a locked hand unit. At 603, method 600 includes switching the virtual skeleton from the two-hand mode to a one-hand mode if the left hand joint and the right hand joint are observed to move outside of a spatial unlocking threshold of one another.

FIG. 7 is a flowchart illustrating a method 700 of positioning and aiming a virtual prop. At 701, method 700 includes modeling a human target observed within a depth map obtained from one or more depth cameras with a virtual skeleton including a plurality of joints. The plurality of joints may include, among others, a left elbow joint, a right elbow joint, a left hand joint, and a right hand joint. The left hand joint and the right hand joint may be locked together as a locked hand unit. At 702, method 700 includes positioning the virtual prop at the locked hand unit. At 703, method 700 includes aiming the virtual prop with a fixed orientation relative to a plane defined by a left elbow joint, a right elbow joint, and the locked hand unit.

The methods illustrated in FIGS. 6 and 7 are nonlimiting examples of tracking a human target in an observed scene and positioning and aiming a virtual prop. The illustrated methods may include additional and/or alternative steps. For example, the methods may include initialization steps in which a human target may be analyzed before a game commences. Such initialization steps may enable smoother downstream transitions between one-hand mode and two-hand mode, for example. In particular, when a virtual prop is enabled, the method may include saved data from an initialization step, allowing for example, the left hand and the right hand of a virtual avatar to grasp a virtual prop. Saved data may include the position of the fingers, and the fingers of a left hand may be used to interpret and display the fingers of a right hand, or vice versa. Saved finger data is provided as one nonlimiting example, and initialization steps may include other saved data enabling smoother downstream modifications and transitions between different modes.

Figure 8:
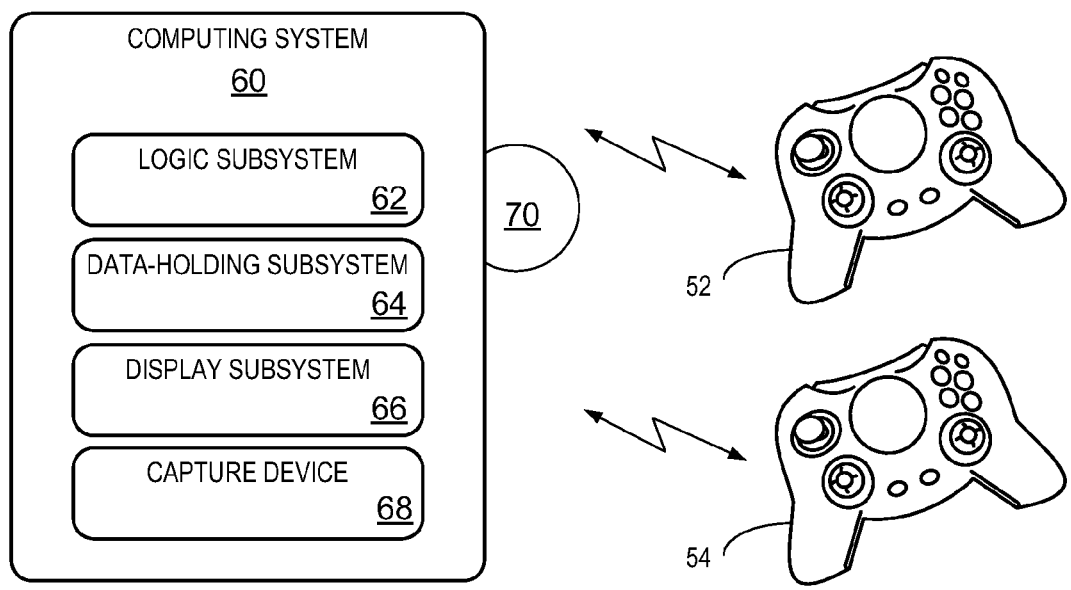
FIG. 8 schematically shows a computing system that may be used as the depth-image analysis system of FIG. 1.

In general, a depth-image analysis system may include a computing system 60, shown in FIG. 8 in simplified form, which may perform one or more of the target recognition, tracking, and analysis methods and processes described herein. Computing system 60 may take a variety of different forms, including, but not limited to, gaming consoles, personal computing systems, public computing systems, human-interactive robots, military tracking systems, and character acquisition systems offering green-screen or motion-capture functionality, among others.

Computing system 60 may include a logic subsystem 62, data-holding subsystem 64, a display subsystem 66, and/or a capture device 68. Computing system 60 may optionally include components not shown in FIG. 8, and/or some components shown in FIG. 8 may be peripheral components that are not integrated into the computing system.

Logic subsystem 62 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices (e.g., a gaming console and a depth camera), which may be remotely located and/or configured for coordinated processing. One or more aspects of the logic subsystem may be virtualized and executed by remotely accessible networked computing devices configured in a cloud computing configuration.

Data-holding subsystem 64 may include one or more physical, non-transitory, devices configured to hold data and/or instructions executable by the logic subsystem to implement the herein described methods and processes. When such methods and processes are implemented, the state of data-holding subsystem 64 may be transformed (e.g., to hold different data).

Data-holding subsystem 64 may include removable media and/or built-in devices. Data-holding subsystem 64 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 64 may include devices with one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 8 also shows an aspect of the data-holding subsystem in the form of removable computer-readable storage media 70, which may be used to store and/or transfer data and/or instructions executable to implement the herein described methods and processes. Removable computer-readable storage media 70 may take the form of CDs, DVDs, HD-DVDs, Blu-Ray Discs, EEPROMs, and/or floppy disks, among others.

It is to be appreciated that data-holding subsystem 64 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 66 may be used to present a visual representation of data held by data-holding subsystem 64. As the herein described methods and processes change the data held by the data-holding subsystem, and thus transform the state of the data-holding subsystem, the state of display subsystem 66 may likewise be transformed to visually represent changes in the underlying data. As a nonlimiting example, the target recognition, tracking, and analysis described herein may be reflected via display subsystem 66 in the form of a game character that changes poses in game space responsive to the movements of a game player in physical space. Display subsystem 66 may include one or more display devices utilizing virtually any type of technology. Such display devices may be combined with logic subsystem 62 and/or data-holding subsystem 64 in a shared enclosure, or such display devices may be peripheral display devices, as shown in FIG. 1.

When included, a communication subsystem may be configured to communicatively couple computing system 60 with one or more other computing devices. Such a communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 60 to send and/or receive messages to and/or from other devices via a network such as the Internet.

Computing system 60 further includes a capture device 68 configured to obtain depth-images of one or more targets. Capture device 68 may be configured to capture video with depth information via any suitable technique (e.g., time-of-flight, structured light, stereo image, etc.). As such, capture device 68 may include a depth camera, a video camera, stereo cameras, and/or other suitable capture devices.

For example, in time-of-flight analysis, the capture device 68 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time, via a technique such as shuttered light pulse imaging.

In another example, structured light analysis may be utilized by capture device 68 to capture depth information. In such an analysis, patterned light (i.e., light displayed as a known pattern such as grid pattern, a stripe pattern, a constellation of dots, etc.) may be projected onto the target. Upon striking the surface of the target, the pattern may become deformed, and this deformation of the pattern may be studied to determine a physical distance from the capture device to a particular location on the target.

In another example, the capture device may include two or more physically separated cameras that view a target from different angles to obtain visual stereo data. In such cases, the visual stereo data may be resolved to generate a depth-image.

In other embodiments, capture device 68 may utilize other technologies to measure and/or calculate depth values. Additionally, capture device 68 may organize the calculated depth information into "Z layers," i.e., layers perpendicular to a Z axis extending from the depth camera along its line of sight to the target.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 60 may optionally include one or more input devices, such as controller 52 and controller 54. Input devices may be used to control operation of the computing system. In the context of a game, input devices, such as controller 52 and/or controller 54 can be used to control aspects of a game not controlled via the target recognition, tracking, and analysis methods and procedures described herein. In some embodiments, input devices such as controller 52 and/or controller 54 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A depth-image analysis system, comprising:
    a logic device in operative communication with one or more depth cameras configured to generate a depth map of an observed scene; and
    a data-holding device holding instructions executable by the logic device to:
        output first mode skeletal data representing a human target in the observed scene if a portion of the human target is observed with a first set of joint positions; and
        output second mode skeletal data representing the human target in the observed scene if the portion of the human target is observed with a second set of joint positions different than the first set of joint positions, the first mode skeletal data having first skeletal joint constraints that allow a left hand virtual skeleton joint to separate from a right hand virtual skeleton joint, and the second mode skeletal data having second skeletal joint constraints that lock together the left hand virtual skeleton joint and the right hand virtual skeleton joint.

2. The depth-image analysis system of claim 1, where the first mode skeletal data is one-hand mode skeletal data identifying each of a plurality of virtual skeleton joints with three-dimensional coordinates, and the first set of joint positions includes a left hand joint and a right hand joint observed in a separated joint position; and where the second mode skeletal data is two-hand mode skeletal data identifying each of a plurality of virtual skeleton joints with three-dimensional coordinates, and the second set of joint positions includes the left hand joint and the right hand joint observed in an unseparated joint position.

3. The depth-image analysis system of claim 2, where the data-holding device holds instructions executable by the logic device to switch from outputting one-hand mode skeletal data to outputting two-hand mode skeletal data if the left hand joint and the right hand joint are observed within a spatial locking threshold for at least a threshold duration.

4. The depth-image analysis system of claim 3, where the data-holding device holds instructions executable by the logic device to switch from outputting two-hand mode skeletal data to outputting one-hand mode skeletal data if the left hand joint and the right hand joint are observed outside of a spatial unlocking threshold.

5. The depth-image analysis system of claim 4, where the spatial locking threshold is smaller than the spatial unlocking threshold.

6. The depth-image analysis system of claim 2, where the two-hand mode skeletal data includes a stable joint complex including a right elbow joint, a left elbow joint, and a locked hand unit.

7. The depth-image analysis system of claim 6, where an occluded one of the right elbow joint and the left elbow joint is positioned as a reflection of an unoccluded one of the right elbow joint and the left elbow joint across a line extending between the locked hand unit and a sternum point.

8. The depth-image analysis system of claim 6, where one or more joints of the stable joint complex have a reduced degree of freedom.

9. The depth-image analysis system of claim 8, where joints not a part of the stable joint complex have normal degrees of freedom.

10. The depth-image analysis system of claim 6, where the locked hand unit includes a right hand joint and a left hand joint locked together in the stable joint complex.

11. The depth-image analysis system of claim 10, where the locked hand unit is constrained to an average observed position of the right hand joint and the left hand joint.

12. The depth-image analysis system of claim 10, where the locked hand unit is constrained to an observed position of an observed hand joint having a highest confidence.

13. The depth-image analysis system of claim 6, where the two-hand mode skeletal data includes a two-handed prop vector with a fixed orientation relative to the stable joint complex and an origination at the locked hand unit.

14. The depth-image analysis system of claim 13, where the two-handed prop vector is perpendicular to a plane defined by the right elbow joint, the left elbow joint, and the locked hand unit.

15. A method of tracking a human target, the method comprising:
    modeling the human target observed within a depth map obtained from one or more depth cameras with a virtual skeleton including a plurality of joints, the plurality of joints including a left hand virtual skeleton joint and a right hand virtual skeleton joint;
    constraining the virtual skeleton to a two-hand mode if the left hand virtual skeleton joint and the right hand virtual skeleton joint are observed to move within a spatial locking threshold of one another, where the left hand virtual skeleton joint and the right hand virtual skeleton joint are constrained to remain locked together as a locked hand unit in the two-hand mode; and
    switching the virtual skeleton from the two-hand mode to a one-hand mode if the left hand virtual skeleton joint and the right hand virtual skeleton joint are observed to move outside of a spatial unlocking threshold of one another.

16. The method of claim 15, where the spatial locking threshold is smaller than the spatial unlocking threshold.

17. The method of claim 15, where the locked hand unit is constrained to an average observed position of the right hand virtual skeleton joint and the left hand virtual skeleton joint.

18. The method of claim 15, where the locked hand unit is constrained to an observed position of an observed hand virtual skeleton joint having a highest confidence.

19. A method of positioning and aiming a virtual prop, the method comprising:
    modeling a human target observed within a depth map obtained from one or more depth cameras with a virtual skeleton including a plurality of joints, the plurality of joints including a left elbow joint, a right elbow joint, a left hand joint, and a right hand joint, the left hand joint and the right hand joint locked together as a locked hand unit; and positioning the virtual prop at the locked hand unit and aiming the virtual prop with a fixed orientation relative to a plane defined by the left elbow joint, the right elbow joint, and the locked hand unit.

20. The method of claim 19, where the fixed orientation is perpendicular to the plane.

21. The depth-image analysis system of claim 10, where a three-dimensional coordinate of the right hand joint and a three-dimensional coordinate of the left hand joint are locked together in the stable joint complex.

* * * * *